April 7, 1970            E. SIRTL            3,505,011
METHOD OF PRODUCING HIGHLY PURE ARSENIC TRICHLORIDE
Filed Feb. 19, 1968
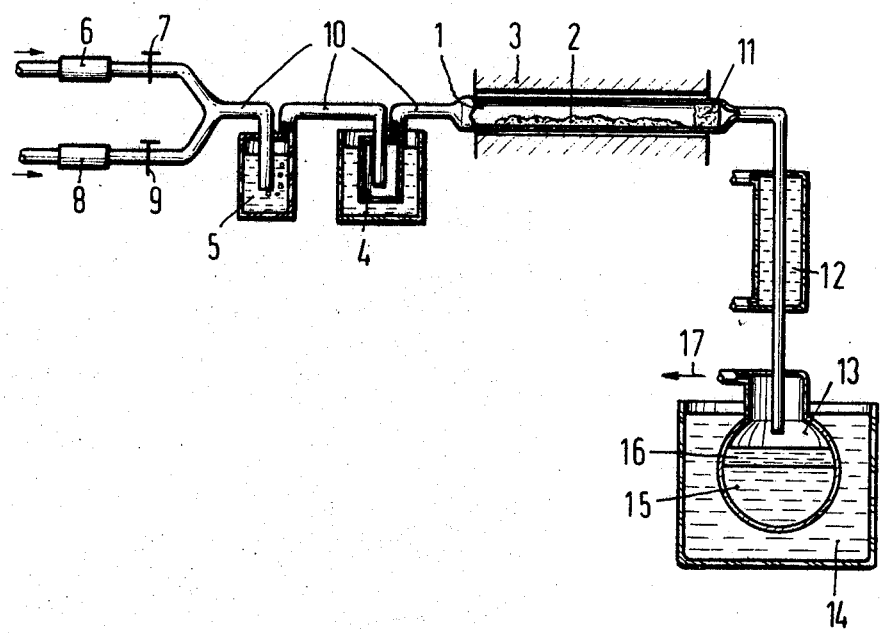

United States Patent Office 3,505,011
Patented Apr. 7, 1970

3,505,011
METHOD OF PRODUCING HIGHLY PURE ARSENIC TRICHLORIDE
Erhard Sirtl, Munich, Germany, assignor to Siemens Aktiengesellschaft, Munich, Germany
Filed Feb. 19, 1968, Ser. No. 706,258
Claims priority, application Germany, Feb. 28, 1967, S 108,554
Int. Cl. C01b 27/00
U.S. Cl. 23—98      8 Claims

ABSTRACT OF THE DISCLOSURE

Described is a process for producing highly purified arsenic trichloride, with less than 0.1 p.p.m. of electrically active impurities, through chlorination of elemental arsenic by gaseous hydrogen chloride in the presence of air or oxygen, in a temporarily heated reaction chamber, in accordance with reaction:

$$As_{(s)} + 3HCl_{(g)} + 3/4O_2 = AsCl_{3(g)} + 3/2H_2O_{(g)} + Q$$

The formation of arsenic trichloride occurs without additional outside heat by utilizing the heat released during reaction. The arsenic trichloride and the aqueous hydrochloric acid resulting from the reaction, the latter containing the impurities distill over into a vessel, cooled to below room temperature forming a two-phase condensate comprised of arsenic trichloride and aqueous hydrochloric acid solution in the receiving vessel.

---

My present invention relates to a method of producing highly pure arsenic trichloride, particularly for semiconductor purposes, with an impurity content less than 0.1 p.p.m., by chlorination of elemental arsenic.

The technical application of $A^{III}B^V$ compounds, which are known in the semiconductor art, is limited by the degree of purity of their original materials. In the production of an $A^{III}B^V$ compound, taking as an example gallium arsenide, the synthesis of this compound is usually effected through reaction of gallium and arsenic trichloride, in the presence of hydrogen. The purity of said compound depends to a high degree upon the purity of the arsenic trichloride used in production.

The simplest way of producing arsenic trichloride is the direct chlorination of elemental arsenic which is easily obtained from the oxide by reducing the latter with hydrogen. This method can be regarded only as barely suitable to obtain a highly pure chloride since gaseous chlorine is obtainable only in a very impure form. This is because the aggressive quality of the chlorine causes new impurities to be easily picked up. Another possibility of producing arsenic trichloride is in reacting arsenic with gaseous hydrogen chloride. However, the reaction rate is slight and furthermore produces the extremely toxic arsenic hydride (arsine) as a byproduct.

It is an object of my invention to provide a method which ensures the chlorination of elemental arsenic while to a very large degree avoiding contamination by impurities, almost completely removing the impurities contained in the starting materials and precluding the occurrence of toxic byproducts.

I achieve this objective by chlorinating gaseous hydrogen chloride, in the presence of air or oxygen, in a reaction chamber which is heated for only a short period according to the reaction:

$$As_{(s)} + 3HCl_{(g)} + 3/4O_2 = ASCl_{3(g)} + 3/2H_2O_{(g)}Q$$

The formation of arsenic trichloride occurs without additional outside heat by utilizing the heat released during reaction. The arsenic trichloride and the aqueous hydrochloric acid resulting from the reaction, the latter containing the impurities distill over into a vessel, cooled to below room temperature forming a two-phase condensate, comprised of arsenic trichloride and aqueous hydrochloric acid solution in the receiving vessel.

It is within the framework of my present invention to reflux the arsenic trichloride condensate, separated from the hydrochloric acid solution, with a nitrogen flow to remove possibly remaining impurities in the presence of a bottom body, comprised of a moisture laden surface active and acid resistant material, subsequently subjecting the arsenic trichloride solution to fractional distillation.

According to a further development of my invention the highly purified arsenic trichloride is reduced by hydrogen, to arsenic and the chlorination and purification process in the same sequence are repeated.

The degree of purity of the arsenic trichloride increases with the number of cycles. Hence, the present invention affords the possibility to produce, in a relatively simple manner arsenic or arsenic trichloride, by effecting a multistep purification process.

In accordance with a particularly preferred embodiment of the present invention the stoichiometric amount of oxygen in the reaction gas is at least 30 to 50%.

Due to the strongly exothermic nature of the reaction, it was found especially favorable, to effect the chlorination in accordance with the turbulent layer or fluidized bed method. This method shows particularly good results in connection with fine grain powders.

It is also within the scope of this invention to heat the reaction chamber only for a short period, to a temperature between 180 and 250° C., preferably to 200° C. at the beginning of the reaction process. Since the reaction proceeds in a strongly exothermic way, no additional supply of heat is required, following the initiation of the reaction.

Based on the heat effects of the reaction Equations $a$ and $b$, at 200° C., the advantage of reacting arsenic in the presence of oxygen is obvious:

(a)    $As_{(s)} + 3HCl_{(g)} = AsCl_{3(g)} + 3/2H_2 - 12$ Kcal.

(b)    $As_{(s)}$ solid $+ 3HCl_{(g)} + 3/4O_2$
                $= AsCl_{3(g)} + 3/4H_2O_{(g)} + 62$ Kcal.

The reaction of 62 Kcal./Mol $AsCl_3$, which occurs in Equation $b$, is sufficient for further formation of arsenic trichloride, without an additional supply of heat from the outside.

To effect additional purification of the reaction gases, prior to their entry into the reaction chamber, the gaseous hydrogen chloride, and the elemental oxygen, are first passed through a 50% perchloric acid solution and subsequently through a cooling trap, preferably maintained at a temperature of —78° C. The cooling trap which is connected directly in front of the reaction chamber is fed with a Dry Ice mixture ($CO_2$). This is particularly well suited as the sublimation point of hydrogen chloride is —81° C.

The collecting vessel for the formation of the two-phase condensate which is comprised of the aqueous arsenic trichloride solution and the impurity containing hydrochloric acid solution, is cooled by means of a temperature bath, preferably to 0° C.

The arsenic trichloride, obtained in this manner, has already obtained a high degree of purity. For further purification of any possibly still present small amounts of impurity, particularly sulphur monochloride ($S_2Cl_2$), the arsenic trichloride solution of the present invention is boiled under reflux at least for one hour, in a nitrogen flow. If necessary a moisture laden, surface active, acid resistant bottom body, in the form of an inorganic oxide hydrate, e.g. aluminum oxide powder, silica gel or titanium dioxide, for a preferred hydrolysis of the remaining sulphur chloride is used according to the equation $$S_2Cl_2 + 2H_2O = H_2S + SO_2 + 2HCl$$

The bottom body is subsequently separated therefrom. In each instance, the raw product is subjected to a fractional distillation in a multiple effect separation column. For this purpose, a column with at least 20 theoretical distillation bottoms was found to be very favorable. An additional advantage of my invention is that many impurities in an oxidizing atmosphere are easily maintained as oxides in the reaction residue, for example silicon as silicon dioxide, and titanium as titanium dioxide.

More details regarding the execution of my invention may be derived from the single figure.

A reaction chamber 1, comprising a quartz tube, holds pulverized arsenic 2, which is provided for chlorination. The quartz tube is completely surrounded by an adjustable furnace 3, which can heat the reaction chamber for short periods to a temperature of approximately 200° C. A cooling trap 4, connected upstream of the reaction chamber 1, is kept to a temperature of −78° C., by a mixture of Dry Ice. To remove the impurities, contained in the reaction gases, a vessel 5 containing a 50% perchloric acid solution is arranged upstream of the cooling trap 4. The reaction gas is formed by the elemental oxygen, flowing into the supply line 10, via the flowmeter 6 and the open valve 7 and by the hydrogen chloride gas, flowing into the supply line 10, via the flowmeter 8 and the open valve 9, by adjusting a mixture of, for example, 30 to 50% oxygen and the remainder hydrogen chloride gas which, after passing through the perchloric acid solution 5, as well as through the cooling trap 4, enters the reaction chamber 1, heated to 200° C., where it reacts with the elemental arsenic contained therein. The gaseous AsCl$_3$ leaves the reaction chamber 1, sealed at the end with a quartz wool stopper 11, serving as a dust filter; together with the sulphuric oxides and arsine freed from the As$_2$O$_3$ by the elemental oxygen and the excess HCl gas and reaches, via a condenser 12 cooled by cold tap water, a receiver 13, which is maintained at 0° C., by a temperature bath 14. After the start of reaction, the receiving vessel contains a two-phase condensate, consisting of aqueous AsCl$_3$ solution 15 and aqueous HCl solution 16, arranged above the latter. The HCl solution contains substantially all of the dissolved compounds stemming from the As$_2$O$_3$. The remaining gases leaves the apparatus at the arrow marked 17.

The AsCl$_3$ solution thus obtained is separated from the aqueous HCl solution by a separating funnel and brought to a boiling under reflux means of a surface active, moisture-laden Al$_2$O$_3$ powder of appropriate purity to remove S$_2$Cl$_2$ and to expell any remaining SO$_2$, in a nitrogen current. It is subsequently subjected to fractional distillation in a column, whose separating effect corresponds to at least 20 theoretical bottoms. Care must be taken that at least 20% of the total charge is separated in a first part, since the arsenic trichloride phase still contains compounds with OH groups (hydroxy chlorides) which dissociate with initial distillation with the splitting off of water.

By employing the known reduction methods the, thus obtained, arsenic trichloride may, if desired, be very easily converted into the elemental arsenic. The arsenic is reduced at 800° C. and condensed at 400° C. The degree of purity of this product may be further increased, depending on need, through a repetition of this cyclical process.

Due to its high purity, the arsenic trichloride, produced in accordance with the present invention, is particularly well suited for the production of gallium arsenide, especially for producing thin, epitactic layers, which are needed for semiconductor components with highest frequency requirements as for example Gunn-diodes. Also, the arsenic trichloride or arsenic, produced in accordance with the present invention, has shown very good results as the original material for other compound semiconductors.

I claim:

1. A method of producing highly pure arsenic trichloride, with a sulphur impurity content of less than 0.1 p.p.m. which comprises chlorinating elemental arsenic, containing sulphur impurities, with gaseous hydrogen chloride with an oxygen content of 30–50%, in a reaction chamber heated to a temperature between 180 and 250° C., in accord with the reaction:

$$As_{(s)} + 3HCl_{(g)} + 3/4\ O_2 = AsCl_{3(g)} + 3/2 H_2O_{(g)} + Q\ (\text{Kcal.})$$

whereby after initiation the formation or arsenic trichloride takes place by utilizing the amount of heat released during reaction, without additional outside heat; the arsenic trichloride and the aqueous hydrochloric acid, formed during reaction and containing the impurities, are received as a distillate in a vessel, cooled to below room temperature, to form a two-phase condensate, comprising as a first phase a solution of arsenic trichloride and as a second phase comprising aqueous hydrochloric acid, containing sulphur oxides, and separating the two phases.

2. The method of claim 1 wherein the arsenic trichloride, separated from the hydrochloric acid phase solution is refluxed in the presence of a bottom body of a moisture-laden, surface-active and acid-resistant material in a nitrogen current to remove any impurities remaining and thereafter subjecting the arsenic trichloride to a fractional distillation.

3. The method of claim 1 wherein the highly purified arsenic trichloride is reduced by hydrogen to arsenic, and repeating the chlorination and purifying process with hydrogen chloride at least once, in the same sequence, on the reduced arsenic.

4. The method of claim 1, wherein the chlorination is effected in a fluidized bed.

5. The method of claim 1, wherein prior to entering the reaction chamber, the mixture of gaseous hydrogen chloride and elemental oxygen is purified by passage through a 50% perchloric acid solution.

6. The method of claim 1, wherein the entering reactant is cooled to −78° C., in a cooling trap prior to entering the reaction chamber.

7. The method of claim 1, wherein the receiving vessel is cooled to 0° C., to form the two-phase condensate.

8. The method of claim 2, wherein the bottom body is selected from the oxide hydrates of aluminum, silicon or titanium.

References Cited

UNITED STATES PATENTS

| | | | |
|---|---|---|---|
| 1,512,733 | 10/1924 | Wescott | 23—98 XR |
| 1,512,734 | 10/1924 | Wescott | 23—98 |
| 1,525,480 | 2/1925 | Wescott | 23—98 XR |
| 1,852,183 | 4/1932 | Miller et al. | 23—98 |
| 1,936,078 | 11/1933 | Adamson | 23—98 XR |
| 2,383,105 | 8/1945 | Booth | 23—98 |
| 2,860,047 | 11/1958 | Reynaud et al. | 23—98 XR |
| 2,970,887 | 2/1961 | Hill | 23—98 XR |
| 3,194,631 | 7/1965 | Cobel et al. | 23—98 |
| 3,240,557 | 3/1966 | Lerner | 23—98 XR |
| 3,359,071 | 12/1967 | Merkel et al. | 23—98 XR |

OTHER REFERENCES

J. W. Mellor's "A Comprehensive Treatise on Inorganic and Theoretical Chemistry," vol. 9, 1929 ed., pages 34, 237, 238, 240 and 241. Longmans, Green & Co., New York.

Jacobson's "Encyclopedia of Chemical Reactions," vol. 1, page 280, Reinhold Publishing Corp., New York.

EDWARD STERN, Primary Examiner

U.S. Cl. X.R.

23—154, 204, 209